United States Patent [19]

Sakamoto et al.

[11] Patent Number: 5,364,445

[45] Date of Patent: Nov. 15, 1994

[54] RECOVERY METHOD OF RHODIUM

[75] Inventors: Masaharu Sakamoto, Numazu; Tomoyuki Mori; Akio Tsuboi, both of Kurashiki, all of Japan

[73] Assignees: N.E. Chemcat Corporation; Mitsubishi Kasei Corporation, both of Tokyo, Japan

[21] Appl. No.: 102,153

[22] Filed: Aug. 4, 1993

[30] Foreign Application Priority Data

Aug. 4, 1992 [JP] Japan .................. 4-228004

[51] Int. Cl.$^5$ .............................. C22B 11/00
[52] U.S. Cl. .......................... 75/426; 423/22
[58] Field of Search ..................... 75/426; 423/22

[56] References Cited

U.S. PATENT DOCUMENTS 3,920,449  11/1975  Onoda et al. ................ 423/312
4,390,366  6/1983  Lea ............................ 75/426

FOREIGN PATENT DOCUMENTS 5039690 of 1975 Japan.

*Primary Examiner*—Peter D. Rosenberg
*Attorney, Agent, or Firm*—Harris Beach & Wilcox

[57] ABSTRACT

A method for recovering rhodium comprising the steps of: adding a basic compound to an organic solution containing a rhodium complex containing at least one type of organophosphorus compound as a ligand and an organophosphorus compound, combusting the resultant mixture to ash under a controlled temperature of less than 1,000° C.; and cleaning the ash using a cleaning solution containing a reducing agent.

16 Claims, No Drawings

RECOVERY METHOD OF RHODIUM

BACKGROUND OF THE INVENTION

The present invention relates to a method for recovery of rhodium from an organic solution containing a rhodium complex having at least one type of organophosphorus compound as a ligand and an organophosphorus compound.

Recently, several methods have been developed wherein soluble complexes of rhodium and organophosphorus compounds are used as catalysts in a homogenous catalytic reaction. These complexes are useful for various reactions such as hydrogenation of olefines carbonyl compounds, and aromatic compounds, etc., hydroformylation and hydrocarboxylation of olefines. Also, since aforesaid complexes are chemically very stable, the catalyst solution can be recycled in the reaction system after separating it from the reaction products by distillation.

However, since various high boiling by-products are formed in the aforesaid reaction and also the catalyst used in the reaction is partially inactivated, a part of the catalyst-containing residue obtained at the recovery of the reaction products by distillation must be removed continuously or intermittently to prevent the accumulation of high boiling by-products and the inactivated catalyst in the reaction medium. The catalyst-containing residue contains an expensive Group VIII noble metals and hence it is necessary to recover the noble metal efficiently.

Generally, to recover the noble metals a wet type recovery method can be used, in which sulfides are added to an organic solution containing noble metals such as rhodium, to form sulfides of the noble metals which are then recovered by precipitation. As an alternative method, noble metal compounds are reduced to metal by addition of a reducing agent. As another alternative, the noble metals are adsorbed to an adsorbent such as an activated carbon.

In still another method, the dry-type recovery method, an organic solution containing noble metals is combusted by using a combustion furnace or in-water combustion furnace to form ash from which rhodium can be recovered.

However, when using the conventional wet-type recovery method, it is not easy for rhodium complex with organophosphorous compounds to react with the sulfides or reducing agent; this is because the organophosphorus compounds are strongly bonded chemically with the noble metal complexes and the rhodium complexes are stable. And, the rhodium compounds are not absorbed sufficiently onto the activated carbon. It thus becomes a practical problem to recover rhodium efficiently and effectively. Moreover, the waste chemicals and exhausted water need to be properly treated as well. And the content of recovered noble metals is relatively low. These are technical drawbacks associated with the conventional wet-type recovery methods.

On the other hand, there are also drawbacks in the dry-type recovery method. The combustion using furnace loses a portion of rhodium, and the obtained ash has a lot of impurities. Even if an in-water combustion furnace which demonstrates relatively high efficiency is employed, a portion of rhodium will be splashed and vaporized during the combustion process, and another portion of the rhodium will be dissolved in the combustion liquid (namely, phosphorous aqueous solution), resulting in a low recovery percentage.

OBJECTS AND SUMMARY OF THE INVENTION

It is, therefore, an object of the present invention to overcome the aforementioned problems associated with conventional methods for recovering noble metal, particularly rhodium. Namely, an object of this invention is to provide a noble method for recovering rhodium as ash with high content from an organic solution containing a rhodium complex and organophosphorus compound.

DETAILED DESCRIPTION OF PREFERRED EMBODIMENTS

As a result of continuous and diligent efforts to achieve the aforementioned objects, the present inventors have invented a novel method for the recovery of rhodium. In it, an organic solution containing a rhodium complex having at least one type of organophosphorus compound as a ligand, together with organic phosphorous compound, is ash-fired to obtain ash, and basic compound is added prior to combustion in order to improve the recovery percentage of rhodium. Moreover, by controlling the ash-firing temperature so that it is lower than 1,000° C., rhodium can be recovered with higher efficiency. Furthermore, by cleaning with a cleaning solution containing a reducing agent, recovery of rhodium as ash with high content can be achieved without loss of rhodium.

According to the present invention, a basic compound is added to an organic solution containing organophosphorous compound and a rhodiumcomplex having at least one type of organophosphorus compound as a ligand, which is then combusted and ash-fired under a controlled temperature of less than 1,000° C. After ash firing, the ash is cleaned using a cleaning solution containing a reducing agent to remove soluble salts of elements other than rhodium, so that rhodium can be recovered at a high efficiency and high content.

As the method of the present invention may be used to recover rhodium from organic solution containing organophosphorus compound and a rhodium complex having at least one type of organophosphorus compound as a ligand, it can also be effectively applied to recover rhodium from a catalyst solution which has been separated, by distillation, from the reaction products of certain types of reactions, such as hydroformylation or hydrocarboxylation using a homogeneous catalyst containing the rhodium complex and organophosphorus compound.

The rhodium complex containing at least one type of organophosphorus compound as a ligand can easily be prepared by the known prior art method from a rhodium compound, such as a hydride, a halide, a carboxylate, a nitrate, a sulfate of rhodium and an organophosphorus compound, such as a tertiary phosphine or phosphite. As the case may be, also, the complex catalyst can be formed during the reaction by supplying a rhodium compound and an organophosphorus compound to the reactor.

Specific examples of rhodium compound which can be used in the preparation of Rh/organophosphorus complex are rhodium compound such as chloropentaaminorhodium (III), chloride, rhodium nitrate, rhodium trichloride, rhodium di-carbonylchloride, rhodiumacetate, and rhodium sulfate, etc.

Also, examples of the organophosphorus compound which can be used in the preparation of Rh/organophosphorus complex are phosphines such as tributylphosphine, chlorodiethylphosphine, tris(aminoamyl) phosphine, tricyclohexylphosphine, triphenylphosphine, tri (N, N-dimethylanilino) phosphine, tris (O-tolyl) phosphine, phenyldiisopropylphosphine, phenyldiamylphosphine, ethyldiphenylphosphine, chlorodihexylphosphine, tris (N, N-diethylaminomethyl) phosphine, ethylene-bis (diphenylphosphine), trianilinophosphine, diphenyl (N, N-dimethylanilinophosphine), triphenylanilinoethylenediphosphine, phosphine, tris (3,5-diamimophenyl) phosphine, aminoethyltriisopropylhexamethylenediphosphine, etc; phosphites such as trimethyl phosphite, triphenyl phosphite, chlorodiphenyl phosphite, tricyclophexyl phosphite, and tetraphenylethylene diphosphite, etc.

According to the present invention, basic compound are added prior to combusting an organic solution containing a rhodium complex and an organophosphorus compound as described above. The basic compounds can be at least one of the group consisting of oxides, peroxides, hydroxides, and carbonates of group Ia or IIa elements in the Periodic Table; for example sodium oxide, sodium peroxide, caustic soda, potassium hydroxide, sodium carbonate, potassium carbonate, sodium bicarbonate, magnesium oxide, calcium oxide, magnesium hydroxide, calcium hydroxide, magnesium carbonate or calcium carbonate. Alternate basic compounds which may be used include sulfides or hydrides of group Ia elements in the periodic table; for instance, sodium a sulfide, sodium borohydride, or salts produced by combining alkali and organic acids; for example, sodium formate, sodium acetate, sodium oxalate or sodium citrate. Preferably the basic compounds are hydroxides or carbonates of group Ia elements in the periodic table, or salts produced by alkali and carboxylic acid; for example caustic soda, sodium formate or a mixture of caustic soda and other type of basic compounds such as sodium formate.

Although it is preferable to add these basic compounds as powder or granular shaped crystals to the organic solution, it is also possible to add them as either a solution or suspension. Moreover, the amount of added basic compounds, depending upon the amount of organophosphorus compounds contained in the organic solution, should be more than 0.1 molar equivalent to organophosphorus atoms. The preferable range is from 0.1 to 20 equivalents. The most favorable range is from 0.3 to 10 equivalents. For an amount of less than 0.1 equivalent, the expected benefit according to this invention can not be achieved. On the other hand, at molar equivalencies over the excess amount, the rhodium recovery rate would not be improved, and the amount of ash formed in the combustion reaction will increase; thus the use of excess amount of basic compounds is not practical.

Although it is normal practice to add the basic compounds to the organic solution before the combustion reaction, it is possible to add the basic compounds to the organic solution during the combustion reaction. In the case where the combustion reaction is performed by spray combustion, the spray combustion can be accomplished by spraying the basic compound solution or suspension into the organic solution mist.

When combusting the organic solution containing a rhodium complex and organophosphorus compounds to ash according to the present invention, the evaporating and the ashing temperature of the organic solution should be controlled so as to improve the percentage of rhodium recovery. There are several methods for controlling the aforesaid temperature at a constant supply amount of the organic solution. For example, these methods are controlling the amount of air to be supplied for combustion, controlling temperature by water- or air-cooling, mixing nonflammable substance such as water in the organic solution, mixing an inert gas such as nitrogen in the supplied air, or combining the aforementioned methods. Although the evaporation and ashing temperature can be controlled by any one of these methods, the most effective and economical way to control these temperatures is by controlling the amount of air supplied to the combustion reaction.

It is appropriate to control the evaporating temperature of the organic solution so that it is in a range of from 140° to 400° C. during the combustion reaction. It is preferable to maintain this temperature in a range of from 160° to 350° C. For the evaporating temperature of lower than 140° C., the combustion reaction would be unstable; more rhodium will be lost due to evaporation or splashing if the temperature is higher than 400° C.

It is appropriate to maintain the ashing temperature at higher than 500° C. but lower than 1,000° C. during the combustion reaction; preferably it should be in a range of between 600° and 950° C. If it is lower than 500° C., it would be difficult to perform a complete ashing, while if it is higher than 1,000° C., more rhodium will be splashed or evaporated, resulting in a poor recovery percentage of rhodium.

The combination of the aforementioned temperature control and the addition of the basic compounds improves the recovery of rhodium effectively in the process of evaporation and ashing of the organic solution.

Since large amounts of soluble impurities such as phosphoric acid or phosphoric salts are present in the fired and recovered ash of an organic solution containing a rhodium complex and an organophosphorus compound, it is desirable to remove these impurities. In the present invention, soluble impurities are dissolved by cleaning the recovered ash, under retardation of elution of rhodium, and the ash containing rhodium is separated and recovered as the insoluble residue, so that rhodium can be recovered with higher efficiency. Water containing a reducing agent would be suitable as a cleaning solution. Although it is not necessary to heat the cleaning solution, the use of solution at a temperature more than 10° C. increases the solubility of the impurities and thus improves the recovery rate of rhodium. The temperature of cleaning solution is preferably in the range of from 40° to 100° C.; in the most preferable case, the cleaning solution is warm at the temperature of between 50° and 80° C.

Examples of possible reducing agents are formic acid, oxalic acid, hydrazine, or sodium borohydride. Sodium borohydride is the preferred reducing agent. The amount of the added reducing agent, depending on the presence or absence of the basic compound during the combustion reaction, and the kind of the reducing agent will preferably be in the range of from 0.001 mole/l to 0.5 mole/l; in the more preferable case, in the range of from 0.005 mole/l to 0.1 mole/l.

If less than 0.001 mole/l is added, the expected benefits of this invention can not be realized. On the other hand, if more than 0.5 mole/l is added, the elution loss of rhodium will be constant and only the operation cost increases—an undesirable result.

It is preferable to add the reducing agent prior to cleaning the ash, but it can also be added after putting the ash into the cleaning solution. A flocculent can aggregate the fine grained (smaller than 0.1 μm type insoluble residue containing rhodium so it is beneficial for the control of the loss of rhodiumby controlling the filter leakage if the ash during solid liquid respiration, especially the filtration operation after cleaning. And this can control the loss of rhodium and enhance the filtration speed. As the type of the flocculent is not specifically limited as long as it is effective in aggregating the fine grained type residue, in particular, it is appropriate to use a small amount of an effective polymeric flocculent an anionic or cationic polymeric flocculent is preferred. When a polymeric flocculent is used, its quantity is decided in such a way that an aqueous solution prepared with a concentration of 0.01~0.05 wt % can be added to the cleaning solution until a flock is formed. Preferred quantities of the aforementioned aqueous solution containing flocculent are in the range of about 0.5~5 cc per 1 l cleaning solution. Although the flock can be formed even if excess solution is added, this is not preferable, since the filtration speed will be reduced.

The amount of cleaning solution needed must be 3~20 times more than the ash weight, and an amount of 5~15 times more than the ash weight is preferable.

After introduction of the cleaning solution to the ash, the soluble salts will be dissolved in more than 10 minutes. The solution time can be effectively shortened by stirring the solution. Thereafter the insoluble residue containing rhodium is recovered by an ordinary filtration operation. A single cleaning procedure enhances the rhodium content of ash, but the cleaning operation can also be repeated. When the cleaning is repeated, the additional cleaning can be done by the decantation method, not by the filtration operation. Moreover, if the filtered insoluble residue is ash-fired at 600°~800° C. for from 3 to 5 hours, followed by cleaning once at least as described above, the cleaning effect will be much improved.

As described above, in recovering rhodium from an organic solution containing a rhodium complex having at least one type of organophosphorus compound as a ligand and organophosphorus compound, any of the techniques of 1) adding the basic compound to an organic solution 2) controlling the evaporation and ashing temperature during the combustion reaction, and 3) using a cleaning solution containing reducing agent are individually effective; if two or three of these techniques are combined, the results are even better.

The invention is explained more specifically by reference to the following.

EXAMPLE 1

An organic solution containing spent catalyst resulting from the hydroformylation of olefine with a rhodium-triphenylphosphine complex, triphenylphosphine, triphenylphosphineoxide and high boiling by-products was used. A sample of 20.00 g of organic solution containing 9.42 mg of rhodium (as calculated as a rhodium atom) and 0.72 g of phosphorous (as calculated as a phosphorous atom) was placed in an 60 cc alumina crucible. A 0.25 g (which is 0.27 equivalent to phosphorous) of granular caustic soda (NaOH) was added. After the generated vapor was ignited with heating the crucible up to 150°~300° C. by using a gas burner, the combustion was continued by blowing air into the crucible for about 10 minutes until the flame disappeared. The ash was collected and was burned further in an electric furnace at 800° C. for 1 hour to obtain 0.72 g of ash. The ashing percentage was 2.6%. Rhodium contained in the ash was dissolved in potassium pyrosulfite. Result of absorptionmetry indicates that 8.57 mg of rhodium was obtained. The calculated percentage of rhodium recovered was 90.98%.

EXAMPLE 2

Rhodium was recovered by procedures similar to those of Example 1, except that the amount of caustic soda added was changed to 0.35 g (which was 0.38 equivalent to phosphorous). The ashing percentage was 3.5% and 8.97 mg of rhodium was recovered. The recovered percentage of rhodium was 95.22%.

EXAMPLE 3

Procedures similar to those of Example 1 were performed except that the amount of caustic soda added was changed to 0.5 g (which was 0.54 equivalent to phosphorous). The ashing percentage was 4.8% and 9.16 mg of rhodium was obtained. The recovered percentage of rhodium was 97.24%.

EXAMPLE 4

Rhodium was recovered by procedures similar to Example 1 except that the amount of caustic soda added was changed to 0.75 g (which was 0.81 equivalent to phosphorous). The ashing percentage was 5.9% and 9.41 mg of rhodium was recovered. The percentage of rhodium recovered was 99.89%.

EXAMPLE 5

Adding 1.0 g of caustic soda (which was 1.08 equivalent to phosphorous), procedures similar to those of Example 1 were performed. The ashing percentage was 7.3% and 9.32 mg of rhodium was collected. The recovered percentage of rhodium was 98.94%.

EXAMPLE 6

Similar procedures were carried out to recover rhodium as in Example 1, except that the added amount of caustic soda was changed to 1.5 g (which was 1.62 equivalent to phosphorous). The ashing percentage was 9.7% and 9.31 mg of rhodium was recovered. The recovery percentage of rhodium was 98.83%.

EXAMPLE 7

Except that the added amount of the caustic soda was changed to 4.0 g (which was 4.31 equivalent to phosphorous), similar procedures were performed to recover rhodium as in Example 1. The ashing percentage was 26.6% and 9.40 mg of rhodium was recovered. The recovery percentage was 99.79%.

EXAMPLE 8

Instead of granular caustic soda, potassium carbonate ($K_2CO_3$) 2.0 g (which was 1.22 equivalent to phosphorous) was added. The rest of procedures were similar to those employed for Example 1. Rhodium in the amount of 9.09 mg was obtained. The recovery percentage was 96.50%.

EXAMPLE 9

Similar procedures to those of Example 1 were performed to recover rhodium, except that instead of granular caustic soda, 3.0 g (which was 1.06 equivalent to phosphorus) of powdered sodium sulfide ($Na_2S:9H_2O$) was utilized. Rhodium in the amount of 8.98 mg was recovered. The recovery percentage was 95.33%.

EXAMPLE 10

Instead of granular caustic soda, 25 wt % caustic soda aqueous solution of 2.0 g, (which was 0.54 equivalent to phosphorous) was added. The procedures used were the same as for Example 1. Rhodium in the amount of 9.18 mg was recovered. The recovery percentage was 97.45%.

EXAMPLE 11

A 40 wt % potassium carbonate aqueous solution 4.2 g (which was 1.05 equivalent to phosphorous) was used instead of granular caustic soda, in procedures otherwise the same as those performed to in Example 1. A recovery of 9.11 mg was obtained. The recovery percentage was 96.71%.

EXAMPLE 12

Instead of caustic soda, a mixture of 40 wt % potassium carbonate (1.4 g) and 1.2 wt % sodium borohydride (SBH) (2.0 g), for a total of 0.46 equivalent to phosphorous, was added. Procedures used were similar to those of Example 1. Rhodium in the amount of 9.14 mg was recovered. The recovery percentage was 97.03%.

EXAMPLE 13

Procedures similar to those of Example 1 were performed, except that 1.0 g of powdered calcium hydroxide (which was 1.16 equivalent to phosphorous) was used, resulting in a yield of 8.80 mg of rhodium. The recovery percentage was 93.42%.

EXAMPLE 14

Except that 12 wt % SBH (1.5 g which was 0.87 equivalent to phosphorous) was used instead of caustic soda, procedures similar to those of Example 1 were used. Rhodium in the amount of 9.03 mg was collected. The recovery percentage was 95.86%.

EXAMPLE 15

Instead of granular caustic soda, 0.8 g of powdered sodium formate (NaHCOO) (which was 0.50 equivalent to phosphorous) was used in procedures similar to those of Example 1. Rhodium in the amount of 8.82 mg was recovered. The recovery percentage was 93.63%.

EXAMPLE 16

Procedure similar to those of Example 1 was employed to recover rhodium, except that 1.1 g of powdered sodium formate (which was 0.69 molar equivalent to phosphorous) was used. Rhodium in the amount of 9.39 mg was recovered. The recovery percentage was 99.68%.

EXAMPLE 17

Instead of granular caustic soda, 0.4 g of powdered sodium formate and 0.4 g of granular caustic soda (total molar equivalent of 0.68 to phosphorous) was added. The remaining procedures were similar to those of Example 1. Rhodium in the amount of 9.27 mg was recovered. The recovery percentage was 98.41%.

Comparative Example 1

As in Example 1, 20.00 g of organic solution was measured into a 60 cc alumina crucible. However, granular caustic soda was not added. Rhodium recovery was 7.80 mg. The recovery percentage was 82.80%.

Comparative Example 2

Similar procedures were performed as in Example 1, except that 1.5 g of sodium chloride (NaCl, which was 1.10 equivalent to phosphorous) was used to recover rhodium. Recovery of 7.87 mg of rhodium was obtained. The recovery percentage was 83.55%.

As clearly shown in the aforementioned examples and comparative examples, rhodium was recovered at a recovery percentage of greater than 90%; this compares with rhodium recovery of only about 80% using prior art methods.

Data on the amount of added basic compounds, molar equivalency to phosphorous, and the recovery percentage of rhodium are listed in Tables 1 and 2.

TABLE 1

| Example | Type of Basic Compounds | Amount Added (g) | Equiv. to Phosphorous | Rhodium Recovery Amt (mg) | Rhodium Recovery Percent (%) |
|---|---|---|---|---|---|
| 1 | GRANULAR NaOH | 0.25 | 0.27 | 8.57 | 90.98 |
| 2 | GRANULAR NaOH | 0.35 | 0.38 | 8.97 | 95.22 |
| 3 | GRANULAR NaOH | 0.5 | 0.54 | 9.16 | 97.24 |
| 4 | GRANULAR NaOH | 0.75 | 0.81 | 9.41 | 99.89 |
| 5 | GRANULAR NaOH | 1.0 | 1.08 | 9.32 | 98.94 |
| 6 | GRANULAR NaOH | 1.5 | 1.62 | 9.31 | 98.83 |
| 7 | GRANULAR NaOH | 4.0 | 4.31 | 9.40 | 99.79 |
| 8 | POWDERED $K_2CO_3$ | 2.0 | 1.22 | 9.09 | 96.50 |
| 9 | POWDERED $Na_2S.9H_2O$ | 3.0 | 1.06 | 8.98 | 95.33 |
| 10 | 25 wt % NaOH sol'n | 2.0 | 0.54 | 9.18 | 97.45 |
| 11 | 40 wt % $K_2CO_3$ sol'n | 4.2 | 1.05 | 9.11 | 96.71 |
| 12 | 40 wt % $K_2CO_3$ sol'n + 1.2 wt % SBH | 1.4 2.0 | 0.46 | 9.14 | 97.03 |
| 13 | POWDERED $Ca(OH)_2$ | 1.0 | 1.16 | 8.80 | 93.42 |
| 14 | 12 wt % SBH | 1.5 | 0.87 | 9.03 | 95.86 |
| 15 | POWDERED NaHCOO | 0.8 | 0.50 | 8.82 | 93.63 |
| 16 | POWDERED NaHCOO | 1.1 | 0.69 | 9.39 | 99.68 |
| 17 | POWDERED NaHCOO | 0.4 | 0.68 | 9.27 | 98.41 |

TABLE 1-continued

| Example | Type of Basic Compounds | Amount Added (g) | Equiv. to Phos- phorous | Rhodium Recovery Amt (mg) | Rhodium Recovery Percent (%) |
|---|---|---|---|---|---|
| | + GRANULAR NaOH | 0.4 | | | |

TABLE 2

| COMPARA- TIVE EXAMPLE | TYPE OF ADDITIVE | AMOUNT ADDED (G) | EQUIVALENT TO PHOSPHOROUS | RHODIUM RECOVERY AMT (mg) | RHODIUM RECOVERY PERCENT (%) |
|---|---|---|---|---|---|
| 1 | — | — | — | 7.80 | 82.80 |
| 2 | NaCl | 1.5 | 1.10 | 7.87 | 83.55 |

As seen from the results of Examples 1 through 17 and Comparative Examples 1 and 2, when combusting and ash-firing an organic solution containing rhodium complex having at least one type of organophosphorus compound as a ligand and organophosphorus compound to recover rhodium, it was found that the recovery percentage of rhodium was significantly improved by adding basic compounds to said organic solution. The procedure used was easily performed.

EXAMPLE 18

An organic solution containing spent catalyst resulting from the hydroformylation of olefines with rhodium-triphenylphosphine complex, triphenylphosphine, triphenylphosphineoxide and high boiling by-products, where 10.00 kg of organic solution contained 4.75 g of rhodium (as calculated as a rhodium atom) and 359 g of phosphorous (as calculated as a phosphorous atom) was examined. Four identical samples were prepared. A stainless steel combustion container with a 20 cm diameter and 10 cm depth was placed on a heater. Each sample was injected to the container with a flow rate of about 40~50 g/min by using a pump. The evaporating temperature was controlled by the amount of blowing air into the heater and combustion container through a pipe with a 50 mm inner diameter from the blower; evaporation temperatures of 160°~200° C., 200°~250° C., 250°~300° C., and 300°~350° C., were used, followed by ash-firing at 700° C. for four hours. A percentage of rhodium recovery corresponding to the evaporating temperature of the organic solution was obtained by analysis of rhodium in the fired ash. Results are shown in Table 3.

TABLE 3

| BOILING TEMP. OF SOL'N (°C.) | AMOUNT OF RHODIUM RECOVERED (g) | RHODIUM RECOVERY PERCENTAGE (%) |
|---|---|---|
| 160~200 | 4.451 | 93.7 |
| 200~250 | 4.437 | 93.4 |
| 250~300 | 4.413 | 92.9 |
| 300~350 | 4.380 | 92.2 |

EXAMPLE 19

Four samples were combusted under procedures similar to those of Example 18, except for the evaporating temperature and the ashing temperature. The evaporating temperature of the organic solution was maintained at 200°~250° C. and the ash-firing temperature of 800° C., 850° C., 900° C., or 950° C. for 4 hours was used. The recovery percentage of rhodium was obtained from the analysis of the rhodium content of the ashes. Results are shown in Table 4.

TABLE 4

| ASHING TEMP (°C.) | RHODIUM AMOUNT RECOVERED (g) | RHODIUM RECOVERY PERCENTAGE (%) |
|---|---|---|
| 800 | 4.432 | 93.3 |
| 850 | 4.431 | 93.3 |
| 900 | 4.375 | 92.1 |
| 950 | 4.372 | 92.0 |

Comparative Example 3

Except that the evaporation temperatures were controlled at 400°~450° C., 450°~500° C., and 500°~600° C., procedures similar to those of Example 18 were preformed. The recovery percentage of rhodium was obtained from the analysis of rhodium content in ash. The results obtained are listed in Table 5.

TABLE 5

| BOILING TEMP. OF SOL'N (°C.) | AMOUNT OF RHODIUM RECOVERED (g) | RHODIUM RECOVERY PERCENTAGE (%) |
|---|---|---|
| 400~450 | 4.241 | 89.3 |
| 450~500 | 4.204 | 88.5 |
| 500~600 | 4.147 | 87.3 |

Comparative Example 4

Procedures similar to Example 19 were used except that the ash firing temperature of 1,000° C., 1,100° C., or 1,200° C. for 4 hours was used. The recovery percentages of rhodium are listed in Table 6.

TABLE 6

| ASHING TEMP (°C.) | AMOUNT OF RHODIUM RECOVERED (g) | RHODIUM RECOVERY PERCENTAGE (%) |
|---|---|---|
| 1000 | 4.189 | 88.2 |
| 1100 | 4.166 | 87.7 |
| 1200 | 4.114 | 86.6 |

EXAMPLE 20

500 g of powdered sodium formate (NaHCOO which was 0.63 equivalent to phosphorous) was added to 10.00 kg of the organic solution. The remaining procedures were similar to those employed for Example 18. The recovery percentages of rhodium are presented in Table 7.

TABLE 7

| EVAP TEMP. OF SOL'N (°C.) | AMOUNT OF RHODIUM RECOVERED (g) | RHODIUM RECOVERY PERCENTAGE (%) |
| --- | --- | --- |
| 160~200 | 4.745 | 99.9 |
| 200~250 | 4.741 | 99.8 |
| 250~300 | 4.693 | 98.8 |
| 300~350 | 4.679 | 98.5 |

EXAMPLE 21

Except that 500 g of powdered sodium formate (NaHCOO which was 0.63 equivalent to phosphorous) was added to 10.00 kg of the organic solution, procedures similar to those of Example 19 were used. The percentage rhodium recovered was obtained from the analysis of rhodium content in ash. Results are listed in Table 8.

TABLE 8

| ASHING TEMP (°C.) | AMOUNT OF RHODIUM RECOVERED (g) | RHODIUM RECOVERY PERCENTAGE (%) |
| --- | --- | --- |
| 800 | 4.736 | 99.7 |
| 850 | 4.726 | 99.5 |
| 900 | 4.724 | 99.5 |
| 950 | 4.712 | 99.2 |

Comparative Example 5

Procedures similar to Example 20 were used, except that the evaporation temperatures were maintained at 400°~450° C., 450°~500° C., and 500°~600° C. The percentage of rhodium recovered was obtained from the analysis of rhodium content in ash. Results are listed in Table 9.

TABLE 9

| EVAPORATION TEMP. OF SOL'N (°C.) | AMOUNT OF RHODIUM RECOVERED (g) | RHODIUM RECOVERY PERCENTAGE (%) |
| --- | --- | --- |
| 400~450 | 4.522 | 95.2 |
| 450~500 | 4.479 | 94.3 |
| 500~600 | 4.441 | 93.5 |

Comparative Example 6

The procedures similar to Example 21 were used, except that the ash-firing temperature of 1,000° C., 1,100° C., or 1,200° C. for 4 hours was used. The percentage of rhodium recovered was obtained from the analysis of rhodium content in ash. Results are listed in Table 10.

TABLE 10

| ASHING TEMP (°C.) | AMOUNT OF RHODIUM RECOVERED (g) | RHODIUM RECOVERY PERCENTAGE (%) |
| --- | --- | --- |
| 1000 | 4.484 | 94.4 |
| 1100 | 4.446 | 93.6 |
| 1200 | 4.422 | 93.1 |

From the above Examples 18 through 21 and Comparative Example 3 through 6, in which rhodium was recovered by combusting and ash-firing organic solutions containing rhodium complex having at least one type of organophosphorus compound as a ligand and organophosphorus compound, it was found that the recovery percentage of rhodium was significantly improved by controlling the evaporation temperature and ashing temperature during the combustion reaction with an easily performed procedure.

EXAMPLE 22

An organic solution containing spent catalyst resulting from the hydroformylation reaction of olefines with rhodium-triphenylphosphine complex, triphenylphosphine, triphenylphosphineoxide and high boiling by-product was prepared. Such an organic solution of 1,000 g contained 475 mg of rhodium (as calculated as a rhodium atom) and 35.9 g of phosphorous (as calculated as phosphorous). Samples were placed into an AISI type 304 stainless steel combustion container with a capacity of 3.1 l (having 20 cm diameter and 10 cm depth) and the burner fired for about 30 minutes to produce ash. The evaporation temperature of the organic solution was maintained at 200°~250° C., and the ashing temperature was maintained at 700°~800° C. Furthermore, the un-combusted tar-like substance was burned at 650° C. for 4 hours in the electric furnace. The recovery percentage at this step was 94~95%.

In the next step, a cleaning solution was prepared by mixing an original cleaning solution, which is a mixture of 1 l of about 70° C. warm water and sodium borohydride (SBH) 0.01 mole, together 0.02 wt % of aqueous solution of the polymeric flocculent aronflock (A-101; Toa-Gosei Chemical Co., Ltd.) 5 cc. After adding the ash and washing for about 30 minutes while stirring, the undissolved residues were filtered. The filtrate was combusted and ash-fired along with the filtration paper at 650° C. for 4 hours (the second ashing). Except that the concentration of the sodium borohydride was maintained at 0.01, 0.05 or 0.1 mole/l, respectively, the ashing, cleaning and burning were performed on three other samples, using procedures similar as in the previous example. Rhodium content and elution loss of rhodium were obtained from analysis of the ash before and after the cleaning process, and in the cleaning solution. Results are tabulated in Table 11.

TABLE 11

| CONCENTRATION OF REDUCING AGENT SBH | | BEFORE CLEANING Rh CONTENT IN ASH | AFTER CLEANING Rh CONTENT IN ASH | ELUTION LOSS % OF Rh |
| --- | --- | --- | --- | --- |
| mole/l | mole/l | wt % | wt % | % |
| 0.01 | 2.43 | 0.59 | 12.12 | 3.01 |
| 0.05 | 12.15 | 0.60 | 13.32 | 0.64 |
| 0.1 | 24.29 | 0.60 | 13.25 | 0.57 |

EXAMPLE 23

Using hydrazine hydrate instead of sodium borohydride (SBH) as a reducing agent, the amount used was 0.01, 0.05, 0.1, and 0.5 mole/l respectively in four experiments. An ashing, cleaning and burning were performed using procedures similar to those of Example 22. From analysis of the ash before and after the cleaning, and in the cleaned solution, rhodium content and cleaning, elution loss of rhodium was obtained. Results are listed in Table 12.

TABLE 12

| CONCENTRATION OF REDUCING AGENT HYDRAZINE HYDRATE | | BEFORE CLEANING Rh CONTENT IN ASH | AFTER CLEANING Rh CONTENT IN ASH | ELUTION LOSS % OF Rh |
|---|---|---|---|---|
| mole/l | mole/l | wt % | wt % | % |
| 0.01 | 0.6 | 0.60 | 11.95 | 7.25 |
| 0.05 | 3.1 | 0.60 | 12.78 | 0.90 |
| 0.1 | 6.3 | 0.60 | 13.40 | 0.86 |
| 0.5 | 31.3 | 0.60 | 13.13 | 0.86 |

Comparative Example 7

Except that the reducing agent was not added, procedures similar to Example 22 were carried out. Results are shown in Table 13.

TABLE 13

| COMPAR. EXAMPLE | CONCENTRATION OF REDUCING AGENT | | BEFORE CLEANING Rh CONTENT IN ASH | AFTER CLEANING Rh CONTENT IN ASH | ELUTION LOSS % OF Rh |
|---|---|---|---|---|---|
| No. | mole/l | mole/l | wt % | wt % | % |
| 7 | 0 | 0 | 0.60 | 8.84 | 14.63 |

EXAMPLE 24

The first combusting was done after adding the 50 g of sodium formate (which was 0.63 equivalent to phosphorous) and the amount of sodium borohydride (SBH) added to the cleaning solution was changed to 0.001, 0.005, 0.01, 0.05, and 0.1 mole/l, respectively in five experiments. The remaining procedures used were similar to those employed for Example 22. The recovery percentage for rhodium before cleaning was 99°~99.8%. Results are seen in Table 14.

TABLE 14

| CONCENTRATION OF REDUCING AGENT SBH | | BEFORE CLEANING Rh CONTENT IN ASH | AFTER CLEANING Rh CONTENT IN ASH | ELUTION LOSS % OF Rh |
|---|---|---|---|---|
| mole/l | mole/l | wt % | wt % | % |
| 0.001 | 0.24 | 0.58 | 25.55 | 1.43 |
| 0.005 | 1.21 | 0.58 | 28.39 | 0.63 |
| 0.01 | 2.43 | 0.59 | 27.04 | 0.25 |
| 0.05 | 12.15 | 0.58 | 27.23 | 0.10 |
| 0.1 | 24.29 | 0.58 | 27.55 | 0.10 |

EXAMPLE 25

The reducing agent was changed from sodium borohydride (SBH) to hydrazine hydrate and the amount of hydrazine hydrate was also changed to 0.005, 0.01, 0.05, 0.1, and 0.5 mole/l respectively in five experiments. The rest of the procedures were similar to those used for Example 24. The results are listed in Table 15.

TABLE 15

| CONCENTRATION OF REDUCING AGENT HYDRAZINE HYDRATE | | BEFORE CLEANING Rh CONTENT IN ASH | AFTER CLEANING Rh CONTENT IN ASH | ELUTION LOSS % OF Rh |
|---|---|---|---|---|
| mole/l | mole/l | wt % | wt % | % |
| 0.005 | 0.3 | 0.58 | 25.88 | 1.25 |
| 0.01 | 0.6 | 0.59 | 26.90 | 0.75 |
| 0.05 | 3.1 | 0.58 | 27.18 | 0.30 |
| 0.1 | 6.3 | 0.58 | 27.49 | 0.30 |
| 0.5 | 31.3 | 0.58 | 26.27 | 0.30 |

EXAMPLE 26

The first ashing was done without adding the sodium formate. Sodium borohydride (SBH) was added in the amount of 0.05 mole/l, and 1.73 mole of caustic soda was used for cleaning. Otherwise procedures were similar to those employed for Example 24, including burning. Results are listed in Table 16.

EXAMPLE 27

Except that the sodium borohydride (SBH) was replaced to the hydrazine hydrate for the cleaning operation, the same procedures were performed as in Example 26. Results are listed in Table 16.

TABLE 16

| Example No. | BASIC COMPOUNDS NaOH mole/l | BEFORE CLEANING Rh CONTENT IN ASH wt % | AFTER CLEANING Rh CONTENT IN ASH wt % | ELUTION LOSS % OF Rh % |
|---|---|---|---|---|
| 26 | 1.73 | 0.59 | 9.19 | 0.33 |
| 27 | 1.73 | 0.60 | 9.95 | 0.54 |

EXAMPLE 28

Ash which was obtained through the procedures of Example 24 was further subjected to a second cleaning using a cleaning solution which was a mixture of 0.001 mole/l of sodium borohydride (SBH) and 1.0 l of 70° C. warm water and 5 cc of 0.02 weight % of aqueous solution of the polymeric flocculent aronflock. This was followed by a second burning.

EXAMPLE 29

Changing the amount of sodium borohydride (SBH) used for the second cleaning to 0.005 mole/l, the remaining procedures were similar to those used for Example 28. Results of Examples 28 and 29 are listed in Table 17.

to the details as set forth and this application is intended to cover any modifications and changes as may come within the scope of the following claims.

What is claimed is:

1. A method for recovering ash containing elemental rhodium and rhodium compounds from a first organic solution, said first organic solution comprising (1) a rhodium complex containing at least one type of organo-phosphorous compound as a ligand and (2) an organo-phosphorous compound, the method comprising the steps of:

adding a basic reactant to said first solution producing a resultant organic solution; and
   combusting said resultant organic solution to ash.

2. The method for recovering ash containing of elemental rhodium and rhodium compounds as recited in

TABLE 17

| Example No. | CONCENTRATION OF REDUCING AGENT SBH mole/l | | BEFORE CLEANING Rh CONTENT IN ASH wt % | AFTER CLEANING Rh CONTENT IN ASH wt % | ELUTION LOSS OF % OF Rh % |
|---|---|---|---|---|---|
| | | mole/l | | | |
| 28 | 0.001 | 0.24 | 0.63 | 67.33 | 1.73 |
| 29 | 0.005 | 1.21 | 0.63 | 51.97 | 0.82 |

Comparative Example 8

Except that the reducing agent was not added, the rest of the procedures were similar to those employed for Example 24. Results are listed in Table 18.

claim 1, wherein said basic compound comprises at least one basic compound selected from a group comprising oxides, peroxides, hydroxides, and carbonates of group Ia and group IIa elements in the Periodic Table.

3. The method for recovering ash containing of ele-

TABLE 18

| COMPAR. EXAMPLE No. | CONCENTRATION OF REDUCING AGENT mole/l | | BEFORE CLEANING Rh CONTENT IN ASH | AFTER CLEANING Rh CONTENT IN ASH | ELUTION LOSS % OF Rh |
|---|---|---|---|---|---|
| | | mole/l | | | |
| 8 | 0 | 0 | 0.58 | 22.83 | 4.21 |

Comparative Example 9

Procedures (namely, the ashing, cleaning, and burning) were used as in Example 26 except that the reducing agent was not added. The results are presented in Table 19.

mental rhodium and rhodium compounds as recited in claim 1, wherein the basic compound comprises at least one basic compound selected from a group comprising sulfides and hydrides of the group Ia elements in the Periodic Table.

4. The method for recovering ash containing of ele-

TABLE 19

| COMPAR EXAMPLE No. | BASIC COMPOUND NaOH mole | BEFORE CLEANING Rh CONTENT OF ASH wt % | AFTER CLEANING Rh CONTENT OF ASH wt % | ELUTION LOSS % OF Rh % |
|---|---|---|---|---|
| 3 | 1.73 | 0.60 | 8.90 | 6.45 |

As seen from above Examples 22 through 29 and Comparative Examples 7 and 8, after combusting the organic solution containing a rhodium complex having at least one type of organophosphorus compound as a ligand and an organophosphorus compound, the ash was further washed and cleaned with a cleaning solution which was a mixture of a reducing agent, flocculent and water to remove soluble impurities without the loss of rhodium. Thus, rhodium can be recovered with high content and efficiency.

While this invention has been explained with reference to the method described herein, it is not confined mental rhodium and rhodium compounds as recited in claim 1, wherein the basic compound comprises at least one of a group of salts produced by a reaction of alkali with organic acid.

5. The method for recovering ash containing of elemental rhodium and rhodium compounds as recited in claim 1, wherein the basic compound comprises more than 0.1 molar equivalent but less than 20 molar equivalents to phosphorous atoms which are contained in the resulting organic solution.

6. In a method for recovering ash containing of elemental rhodium and rhodium compounds from a first organic solution, said first organic solution comprising (1) a rhodium complex containing at least one type of an organo-phosphorous compound as a ligand and (2) an organo-phosphorous compound, wherein said first organic solution is combusted to ash, the improvement comprising:

controlling a combustion temperature at which ash is formed to remain at less than 1,000° C.

7. The method for recovering ash containing of elemental rhodium and rhodium compounds recited in claim 1, wherein a combustion temperature at which ash is formed is maintained at less than 1,000° C.

8. The method for recovering ash containing of elemental rhodium and rhodium compounds recited in claim 6 or claim 7, wherein an evaporating temperature of said organic solution prior to combustion to ash is maintained at less than 400° C.

9. In a method for recovering ash containing elemental rhodium and rhodium compounds from a first organic solution, said first organic solution comprising (1) a rhodium complex containing at least one type of an organo-phosphorous compound as a ligand and (2) an organo-phosphorous compound, wherein said first organic solution is combusted to ash, the improvement comprising the further step of:

cleaning said ash using a cleaning solution containing a reducing agent to remove impurities such as soluble salts of elements other than rhodium.

10. The method for recovering ash containing elemental rhodium and rhodium compounds recited in claim 1, comprising the further step of:

cleaning said ash by using a cleaning solution containing a reducing agent to remove impurities such as soluble salts of elements other than rhodium.

11. The method for recovering ash containing elemental rhodium and rhodium compounds recited in claim 6, comprising the further step of:

cleaning said ash using a cleaning solution containing a reducing agent to remove impurities such as soluble salts of elements other than rhodium.

12. The method for recovering ash containing elemental rhodium and rhodium compounds recited in claim 9, wherein a basic compound is added to said cleaning solution.

13. The method for recovering ash containing elemental rhodium and rhodium compounds recited in claim 9, wherein cleaning or cleaning followed by burning is performed more than twice.

14. The method for recovering ash containing elemental rhodium and rhodium compounds recited in claim 9, wherein a flocculent is added to said cleaning solution.

15. The method for recovering ash containing elemental rhodium and rhodium compounds recited in claim 9, wherein said cleaning solution comprises water or warm water.

16. A method for recovering ash containing elemental rhodium and rhodium compounds comprising the steps of:

adding a basic compound to an organic solution containing (1) a rhodium complex containing at least one type of organo-phosphorous compound as a ligand and (2) an organo-phosphorous compound resulting in a mixture;

combusting the mixture to ash under a controlled temperature of less than 1,000° C.; and cleaning said ash using a cleaning solution containing a reducing agent.

* * * * *